United States Patent [19]

Gilch et al.

[11] Patent Number: 4,618,651

[45] Date of Patent: Oct. 21, 1986

[54] ADHESIVE COMPOSITIONS

[75] Inventors: Heinz Gilch, Bad Homburg-Kirdorf; Hubertus von Voithenberg, Bad Homburg; Karl-Heinz Albert, Oberursel, all of Fed. Rep. of Germany

[73] Assignee: USM Corporation, Farmington, Conn.

[21] Appl. No.: 766,592

[22] Filed: Aug. 19, 1985

Related U.S. Application Data

[63] Continuation of Ser. No. 595,595, Apr. 2, 1984, abandoned.

[30] Foreign Application Priority Data

Apr. 5, 1983 [GB] United Kingdom ............. 8309129

[51] Int. Cl.$^4$ ............................................. C08L 23/00
[52] U.S. Cl. ................................. 525/130; 523/167; 524/270
[58] Field of Search ......................................... 525/130

[56] References Cited

U.S. PATENT DOCUMENTS 3,437,622  4/1969  Dahl .................... 524/270
3,931,077  1/1976  Uchigaki et al. ............ 525/130
4,071,505  1/1978  Meckel et al. ............. 528/73

FOREIGN PATENT DOCUMENTS 755152   3/1967  Canada ................... 528/73
2303058  1/1976  France .
1479987  7/1977  United Kingdom .
1540634  2/1979  United Kingdom .

Primary Examiner—John C. Bleutge
Assistant Examiner—A. L. Carrillo
Attorney, Agent, or Firm—Thomas S. Szatkowski

[57] ABSTRACT

Novel, solvent free adhesive compositions comprising a moisture curable polyurethane formed from a first component comprising a diisocyanate, and a second component comprising a substantially linear hydroxy polyester in proportions to provide a prepolymer having from 1.0 to 2.0 percent by weight —NCO groups available for reaction, and a third component comprising a monofunctional reactant present in an amount sufficient to react with 1–40 mole % of the reactive —NCO groups of the product of the prepolymer reaction. A layer of applied adhesive may be exposed to airborne moisture under relatively mild conditions to bring about chain extension of the moisture curable polyurethane, after which the layer of the adhesive composition may be heated to bring it to tacky adhesive condition. The chain extended adhesive composition is storable for at least several days without affecting the bond strength.

10 Claims, No Drawings

ADHESIVE COMPOSITIONS

This is a continuation of aplication Ser. No. 595,595 filed Apr. 2, 1984, now abandoned.

BACKGROUND OF THE INVENTION

This invention is concerned with improvements in or relating to adhesives and adhesive bonding.

In the field of adhesives, various proposals have been made with a view to avoiding fire and toxicity hazards associated with use of so-called solvent based adhesives. For example, proposals have been made to employ so-called hot melt adhesives for adhesive bonding of various materials. In the field of packaging for example hot melts are attractive from the point of view of speed of set up and ease of automatic or semi-automatic application. However, in some fields for example shoe manufacture, hot melt adhesives are not widely used partly because relatively high application temperatures have been required with consequent risk of degradation of the adhesive or potential damage to personnel or substrates to be bonded. Also, ready provision of adequate adhesive bonds does not appear possible with certain substrate materials commonly employed in the shoe trade using conventional hot melt adhesives.

An important requirement in providing adhesive bonds is that the composition applied must have sufficient fluidity to enable it adequately to wet the substrate to which it is applied. Preferably also the composition should effect at least limited penetration of fibrous substrates. Often it is also important that the composition has or develops a tough and strong condition in the bond. These requirements of adequate wetting and development of toughness and strength are notable in adhesively bonding shoe soles to shoe uppers, where the finished product may be expected to be subjected to variations in stress under various conditions of use. When using solvent based adhesives, this initial fluidity has been secured by the use of volatile organic solvent solutions of adhesives which develop strength and toughness after evaporation of the solvent.

An adhesive capable of application in solvent-free condition and which cures to form strong bonds to a variety of substrates (including those commonly employed in the manufacture of shoes) in an economically acceptable time, would be commercially highly desirable. Indeed, for many years it has been desirable to provide an adhesive applicable as a hot melt without risk of heat damage and which cures to provide strong sole attaching bonds on a variety of substrates.

In our U.K. Patent Specification No. 1540634 there is described and claimed a method of adhesively bonding a shoe sole to a shoe upper using selected urethane prepolymer compositions which are provided as fluid compositions and which are convertible by a chain extension treatment to a polyurethane which is tacky and capable of adhesive union when heated and so to establish substantially immediate strong adhesive union with a compatible adhesive or resin surface. The chain extension is preferably done at higher temperatures under humid conditions, e.g. in a steam cabinet or alternatively at room temperatures at relative humidities of 20 to 60%.

The method described in U.K. Patent Specification No. 1540634 has the advantage of employing a substantially solvent-free adhesive composition applied at a comparatively low temperature, but a significant disadvantage accompanying use of the preferred adhesive compositions there described is the considerable time needed for chain extension of the prepolymer after application. The uppers which are cemented with the prepolymer have to be cured for significantly long periods of time at comparatively high temperature and comparatively high humidity in order to give required chain extension sufficient to obtain a bond of acceptable initial strength. Under these conditions, the shoe uppers may become damaged by the high humidity. Lower relative humidity slows the rate of the chain extension reaction down to an extent which renders the process more unacceptable.

Attempts to improve the speed of chain extension for example by appropriate selection of raw materials have met with some success, but the practical requirements for tolerance of chain extension conditions and of delays prior to heat activation conditions used in a shoe factory, together with the need also for producing strong bonds to a variety of substrates pose a significant problem.

Characteristics desirable for an adhesive composition for application in at least substantially solvent-free form for sole attaching purposes include the following properties. The adhesive composition should be capable of application in fluid form at a temperature which is sufficiently low that the shoe making materials used are not adversely affected, and so that persons who may come in contact with the hot melt do not suffer burns to the skin. Thus, application temperatures of 100° C. or less are highly desirable. In order to be applicable at such temperatures the adhesive composition should have at such temperatures viscosity and flow characteristics which enable it to properly wet surfaces to which it is applied and preferably also to penetrate fibrous materials for example leather, whereby to establish at an early stage in the process good conditions for forming adhesive bonds to the materials. When cooled, coatings of the adhesive present on the materials should harden adequately within a few minutes to provide at least a non-tacky surface, and preferably a solid form-retaining non-tacky coating on the material to the extent that soles and shoe uppers coated with the adhesive composition may be handled and stored for limited periods of time without sticking together and without significantly disturbing the applied layers of adhesive composition. Coatings of the adhesive composition on the sole should remain at least for a period of three days, and preferably for up to 60 days capable of heat activation, for example by exposure to a radiant heater set at 85° C. to 95° C., to a condition in which sole spotting can be carried out and of then establishing a substantially immediate adhesive union with the coating of adhesive composition on the shoe upper by pressing the sole and shoe upper together in a sole press. It is also desirable that the adhesive union achieved between the sole and shoe upper should initially be sufficiently strong to avoid springing of the sole edges from the shoe upper during handling and storage immediately after sole pressing, and should be or become adequate to withstand normal conditions of use of the shoe as epitomised by ability to withstand a peel test at 5 Kg per cm width carried out 72 hours after sole pressing.

When using an adhesive composition comprising a moisture curable polyurethane prepolymer, it is desirable that coatings of the adhesive composition on the sole should be susceptible to the effect of moisture in the atmosphere under normal, ambient, conditions of storage of the soles (i.e. approximately 20° C.±5° C. and relative humidity of not less than approximately 10%) to bring about conversion of the prepolymer to a tough, solid, but heat softenable condition. It is convenient if this condition is achieved during storage overnight and it is highly desirable that the conversion of the prepolymer of an adhesive composition coating on the sole does not progress during storage in such a way that the coating becomes incapable of being satisfactorily heat softened during a period of less than seven days after application, in view of a normal practice in shoe making whereby adhesive coated soles may be kept in storage under ambient conditions over a weekend or more prior to attachment to the shoe.

It is one of the objects of the present invention to provide an improved method of bonding a sole to a shoe upper.

The term "shoe" where used herein relates to outer footwear generally and includes the article in the course of manufacture. The term "sole" where used herein relates to shoe tread members generally and includes heels and sole and heel units.

SUMMARY OF THE INVENTION

We have now found that an adhesive composition which is initially sufficiently fluid at relatively low temperatures to enable wetting adhesive engagement with a surface and which is convertible either at room temperature or at elevated temperature to a solid, non-tacky but heat softenable condition in which it is capable of establishing substantially immediate strong adhesive union with a compatible adhesive or resin surface and which can be used to provide acceptable sole attaching bonds without undue delay in the shoe making process may comprise selected polyurethanes.

In its broadest aspect, the invention provides a method of bonding a sole to a shoe upper comprising the steps of providing on attaching surfaces of one or both of the sole and shoe upper a layer of adhesive composition comprising a moisture curable polyurethane formed from a first component comprising a diisocyanate, and a second component comprising a subtantially linear hydroxy polyester in proportions to provide a prepolymer having NCO groups available for reaction, and a third component comprising a 1 reactant present in an amount sufficient to react with 1–40 mole % of the NCO groups of the product of the prepolymer reaction, exposing each layer of adhesive composition to airborne moisture to bring about chain extension of the moisture curable polyurethane, heating the layer or at least one of the layers of the adhesive composition to bring it to tacky adhesive condition, and pressing the attaching surfaces of the sole and shoe upper together with the composition.

In another of its aspects, the invention provides a novel solvent free, adhesive composition capable of application to a workpiece in heat softened condition to provide a layer which after exposure to moisture is capable of activation by heat to a bond forming condition to form an adhesive bond, the composition comprising a minor amount of a tackifying resin and a moisture curable polyurethane formed from a first component comprising a diisocyanate, and a second component comprising a substantially linear hydroxy polyester diol having a crystalline melting point in the range 40° to 70° and a molecular weight in the range 1500 to 6000 in proportions to provide an NCO:OH ratio in the range 2.5:1 to 1.25:1 and to provide a prepolymer having NCO groups available for reaction, and a third component comprising a monofunctional reactant having as its sole reactive group —OH or —NH$_2$ group, present in an amount sufficient to react with 1–40 mole % of the NCO groups of the product of the prepolymer reaction.

By virtue of the selection of the polyurethane ingredients it is possible to prepare a polyurethane of required characteristics capable of use in an adhesive composition suitable for sole attaching in a convenient manner without exposing the shoe upper or sole to excessive conditions of temperature or humidity. In particular, the use of the monofunctional reactant in the relative amounts described above, makes possible an adhesive composition which is capable not only of chain extension under a variety of conditions, and of subsequent heat activation at temperatures similar to those used for solvent borne adhesives after sole-storage times more similar to those applicable to soles coated with solvent borne adhesives (as is highly desirable for use in a shoe factory), but also surprisingly high bond strengths, both in respect of the bond immediately after forming the bond and in respect of the bond after aging.

DESCRIPTION OF PREFERRED EMBODIMENTS

The selection of ingredients employed to prepare the prepolymer for an adhesive composition for sole attaching is significant in relation to ensuring the polyurethane has necessary characteristics for example the capability for extrusion in heat softened condition onto a workpiece at temperatures in the range 60° C. to 110° C., the capability at such temperatures to flow and properly wet normal shoemaking materials, and even to penetrate somewhat fibrous materials, the ability to provide when cooled a form-retaining non-tacky layer on such materials, the capability for chain extension by moisture followed by heat activation, the capability for relative adjustment between the sole and shoe upper as the bond is being made, and the capability to provide adhesive bonds of acceptable strength.

Diisocyanates for use as the first component from which the prepolymer of an adhesive composition according to the invention may be formed are preferably aromatic for example toluene diisocyanates, and diphenyl methane diisocyanates and mixtures thereof. Pure 4,4' diphenyl methane diisocyanate is a preferred aromatic diisocyanate, but other materials, for example a mixture of 4.4'- and 2.4'-isomers of diphenyl methane diisocyanate may be used, which may yield advantages in relation to tack retention and spotting tack for example when the second component comprises poly (hexane diol adipate). It is important that the first component be at least substantially difunctional in order to facilitate production of a polyurethane capable of satisfactory chain extension and heat activation. We prefer to avoid trifunctional isocyanate contents of more than 10% by weight of the first component.

Polyesters suitable for use in the second component from which the prepolymer of an adhesive composition according to the invention may be formed are at least partially crystalline and include the hydroxyl terminated polyesters of aliphatic hydroxy acids and their lactones and include the more preferred hydroxyl polyesters of 6 to 12 carbon atoms linear aliphatic dicarboxylic acids for example adipic, azelaic, and sebacic acids with, preferably even numbered, linear aliphatic diols having from 4 to 8 carbon atoms in their molecular chains for example 1,4- butane diol and 1,6-hexane diol.

The acid component of the polyester polyol may include up to 25% on a molar basis of other acids or their ester forming derivatives for example cyclohexane dicarboxylic acids, terephthalic acid and isophthalic acid. The glycol component may include up to 15% on a molar basis of other diols for example diethylene glycol and 1,4-cyclohexane dimethanol. The polyesters have a molecular weight in the range from 1,500 to 6,000 and preferably from 2,500 to 4,500 and have a crystalline melting point in the range from 40° C. to 70° C., preferably 45° C. to 65° C. The term "crystalline melting point" where used herein indicates the temperature at which crystalline segments of the material melt, and is determined as the temperature of the major endotherm peak in a differential thermal analysis. When the polymer is brought above its crystalline melting point in application or activation, the crystalline segments melt and cause softening of the polymer. The molecular weight of the polyester is of significance in that increasing molecular weight of the polyester tends to lead to the resulting polyurethane becoming progressively more difficult to extrude as a hot melt at acceptable temperatures whereas decreasing molecular weight of the polyester tends to lead to polyurethanes which are not sufficiently solid at room temperature. We prefer to use a poly (butane diol adipate) of molecular weight about 3,500 and crystalline melting point of about 50° C.

The monofunctional reactant of the third component is an important feature of the formulation, and several advantages flow from use of the monofunctional reactant in a composition according to the invention. In particular, it is possible to achieve an adhesive composition which is capable not only of chain extension under a variety of conditions, and of subsequent heat activation at temperatures similar to those used for solvent borne adhesives after sole-storage times more similar to those applicable to soles coated with solvent borne adhesives (as is highly desirable for use in a shoe factory), but also surprisingly high bond strengths, both in respect of the bond immediately after forming the bond and in respect of the bond after ageing. The monofunctional reactant has significant influence on preserving the ability of the chain extended layer to be activated by heat for periods which are longer than have been achieved previously, and which are such as to render compositions according to the invention susceptible of use in making shoes under factory conditions. Whilst not wishing to be bound by any particular theory, we believe this advance is due in some way to a limiting of the amount of monomeric diisocyanate in the formulation and a limiting of the ability to form cross links between polymer molecules during ageing of the chain extended polyurethane rather than a mere controlling of chain length of the chain extended polyurethane molecules.

The monofunctional reactant used is preferably a material which is not sufficiently volatile to be lost from the composition under conditions of use. The monofunctional reactant has as its sole reactive group an —OH or —NH$_2$ capable of reaction with NCO groups. We prefer to employ as monofunctional reactant an aliphatic linear or branched chain primary alcohol having a boiling point greater than 100° C. and having about four to about fourteen carbon atoms in its molecule for example hexanol, octanol, 2-ethyl hexanol, 1-butanol.

The monofunctional reactant may be used in amounts sufficient to react with as much as 40 mole % of the NCO groups of the product obtained from the prepolymer reaction. However, significant benefits can be achieved with quantities sufficient to react with as little as 5 mole % of the isocyanate groups of the prepolymer reaction product. In preferred sole attaching adhesives we prefer to use sufficient to react with 1 to 20 mole %: of the NCO groups and more preferably from 5 to 15 mole % of the NCO groups. With regard to peel bond strength, optimum results appear to be achieved by use of sufficient of the preferred monofunctional reactant, namely 2-ethyl hexanol, to react with about 10 mole % of the NCO groups of the product obtained from the prepolymer reaction.

The urethane prepolymer is made by reaction of the first and second components in proportions to provide a prepolymer having NCO groups available for reaction. The proportions are such as to have (without addition of the third component) an —NCO to —OH ratio in the range from 2.5:1 to 1.25:1, preferably about 1.8:1 to 1.5:1 to provide a prepolymer having from about 1.0% to about 2.0% preferably about 1.3% to 1.7% NCO groups by weight of the prepolymer available for chemical reaction. The third component is preferably added to the reaction mixture after mixing of and reaction between the first and second components. Excessive isocyanate contents are avoided in order to ensure ability of the polyurethane to become converted by action of moisture, when required, to the desired chain extended condition in which it may be heat activated to bond-forming condition. The polyurethane is preferably made "in the melt". It is desirable to include a stabiliser, for example a monofunctional isocyanate, or an acid chloride, for example tosyl isocyanate, benzoyl chloride, acetyl chloride or sebacoyl chloride in amounts of from 0.05% to 0.2% by weight of the urethane prepolymer.

An adhesive composition according to the invention preferably comprises a catalyst to enhance the speed of the chain extension reaction. It is convenient to include the catalyst in the prepolymer forming reaction. Suitable catalysts include the known polyurethane catalysts: we prefer to employ a diorgano tin compound for example dibutyl tin dilaurate or a mercapto tin compound. When it is desired to have an adhesive which retains its capability for heat activation for a longer period (e.g. for more than 14 days on the sole), we prefer to use a mercapto tin catalyst. In general, amounts of catalyst from 0.05% to 1% by weight based on the weight of prepolymer may be used. Conveniently, the catalyst is added to the reactants as a solution in a very small amount of plasticiser i.e. less than 1% by weight of the composition.

A composition according to the invention includes a tackifying resin. Tackifying resins effective to improve the establishment of adhesion include tackifiers of the hydrocarbon type such as the unsaturated hydrocarbons, terpenes e.g. alpha-and beta-pinene polymers, low molecular weight styrenes such as polyalphamethyl styrene, rosin esters and coumarone-indene resins. We prefer to use a coumarone-indene resin to provide up to about 10% by weight, more preferably from 3% to 5% by weight of the composition.

Inert fillers in general such as clays, carbonates, titanium dioxide and others may be included in the compositions but this is not preferred for sole attaching adhesives.

As discussed above, adhesive compositions according to the present invention have reactive NCO groups and are sensitive to air-borne moisture, and it is therefore necessary to prevent premature polymerisation of the polyurethane during storage of the composition. To this end the adhesive composition is preferably stored under conditions of exclusion of materials reactive with the polyurethane, for example in a sealed dry, at least substantially impervious, container e.g. a cartridge or a drum.

The composition is preferably solid at room temperature with a melting point in the range 45° C. to 70° C. The polyurethane is preferably a solid of comparatively low molecular weight and has crystalline segments in the polymer molecule having a relatively low crystalline melting point, and can be applied on a surface at a relatively low temperature in the range 60° C. to 110° C., at which it is freely fluid for entering wetting adhesive engagement with the surface.

Preferred compositions according to the invention are particularly useful in attaching soles to shoe uppers by a method in which a layer of the adhesive composition is applied in heat softened condition to each of the sole and shoe upper. They may also be used satisfactorily in other ways in the shoe making process and indeed in bonding processes employed in other trades or industries.

When a layer of an adhesive composition according to the invention is applied to a workpiece, the composition can be chain extended by exposure to airborne moisture to bring the adhesive to a non-tacky, flow resistant but heat softenable condition. The chain extension reaction should be carried to an extent at which the layer becomes somewhat rubbery, but deformable and flowable under pressure and capable of being rendered tacky and capable of adhesive union on subsequent heat activation, but not markedly crosslinked, i.e. the film is still soluble or attacked by active polyurethane solvents such as dimethyl formamide or tetrahydrofuran.

In the practice of the invention, the adhesive composition is applied in fluid form and preferably is applied in a solvent free condition as a melt. However, presence of a minor amount of solvent may be desirable at the time of application when it is desired to apply the adhesive composition at moderately elevated temperature below the temperature required to melt the composition in the absence of solvent. Thus, the fluid composition has the fluidity needed for wetting adhesive engagement with the surface, as a result of heating to a relatively low temperature which is nevertheless somewhat above the crystalline melting point of the polyurethane, or the composition may comprise a solution of the polyurethane dissolved in an inert organic solvent which is removed for example by evaporation prior to the chain extension reaction. When the polymer is brought above its crystalline melting point in application or activation, the crystalline segments melt and cause softening of the polymer. After application, the polyurethane is preferably brought below its crystalline melting point and is allowed to crystallise to develop a resistance to flow and distortion of the layer at temperatures used in the succeeding step of chain extension. In those cases where the fluid composition comprises a solution of the polymer in an inert volatine solvent, it may be applied at room temperature or at slightly elevated temperatures. Solvents which may be used are volatile organic liquids which do not contain active hydrogen. Among those which may be employed are xylene, toluene, dimethyl formamide, acetone, methyl ethyl ketone, ethyl acetate, cellulose acetate, methylene chloride and mixtures of these. Because of the nature of the polyurethanes employed in the present method, relatively high solids content solutions for example 60% by weight and higher, have viscosities low enough for application in wetting engagement with surfaces.

In carrying out a method of sole attaching, the adhesive composition may be applied in fluid condition to a sole attaching surface on the bottom of a shoe upper or the attaching surface of an outsole by suitable applicator means or even by hand. Relatively low application temperatures, for example, temperatures of 80° C. to 100° C. have been found useful with solvent-free adhesive compositions according to the invention. It is desirable that the thickness of coatings of the adhesive composition be uniform in order that the chain extension be uniform. It is preferred that the coating be from about 1 to about 5 mils in thickness for most satisfactory and uniform chain extension throughout the thickness of the coating. Relatively thin coatings are effective on relatively regular surfaces such as the attaching surface of the outsole, and coatings as thin as 0.003" may be applied to more irregular surfaces such as the sole attaching surface on the bottom of a shoe upper.

Chain extension of the polyurethane by exposure to moisture may be carried out under a variety of conditions. For example, using preferred compositions satisfactory chain extension by exposure to airborne moisture can be achieved by exposure to a moisture saturated atmosphere i.e. not less than 25% RH at 90° C. for about 10 to 15 minutes, or by exposure to ambient storage conditions (i.e. varying in the range 20° C.±5° C. and relative humidity of not less than 10%) for a period of 15 hours to 60 days, or by treatment with infra-red radiation and steam in a chamber as disclosed in U.K. Patent Application No. 8230200 under controlled conditions. For example, a layer of preferred adhesive composition applied to the shoe upper can be sufficiently chain extended by treatment under conditions attained in such a chamber by exposure for 10 to 40 seconds, dew point 50 to 60° C. infra-red radiant surface temperature 350° C. and steam supply for 5 to 10 seconds, followed by a period of cooling in atmosphere at room temperature for as long as 18 hours. After chain extension, the layer or at least one of the layers of adhesive composition may be subjected to heating in order to bring the adhesive composition to a tacky, adhesive bond forming condition. With such a process, it appears important that the steps of heat activation be carried out when the adhesive on the shoe upper has been allowed to cool in atmosphere at room temperature for not less than about 10 minutes and not more than 18 hours, and when the adhesive on the sole has been aged in atmosphere at room temperature for not less than 6 hours and not more than about 10 weeks. The heating may conveniently be carried out by exposure to infra-red radiation in an infra-red heater set at 80° C. to 100° C. for 3 to 15 seconds in commercially available apparatus. The sole and shoe upper may then be spotted together with the activated layer or layers between them and placed in a sole attaching press for about 6 to 15 seconds with the adhesive composition between them.

Prior to application of the layer or layers of adhesive composition to a sole or shoe upper, the sole or shoe upper may be subjected to a pretreatment for example as normally employed in the shoe making trade, e.g. roughing of leather components, or priming e.g. halogenation of certain rubber components.

According to the practice of the invention, soles may be bonded to shoe uppers by use of an adhesive composition, comprising selected polyurethanes, which is initially sufficiently fluid at relatively low temperatures to enable wetting adhesive engagement with a surface and which is convertible either at room temperature or at elevated temperature to a solid, non-tacky but heat softenable condition in which it is capable of establishing substantially immediate strong adhesive union with a compatible adhesive or resin surface, so as to provide acceptable sole attaching bonds without undue delay in the shoe making process.

In order that the invention may become more clear, there now follows a description of two example adhesive compositions each of which compositions is according to the invention and illustrative thereof. It will, of course, be understood that the illustrative compositions have been selected for description to illustrate the invention by way of example only and not by way of limitation thereof.

The first illustrative composition comprised a moisture curable polyurethane prepolymer having about 1.6% by weight NCO groups available for reaction, a crystalline melting point of about 50° C. and viscosity at 100° C. of 22,000 mPas (Viscosimeter Mk 500 SV II 10 rpm). The prepolymer was synthesised from a hydroxyl terminated susbstantially linear polyester from 1.4 butane diol and adipic acid i.e. a poly (butane diol adipate) of molecular weight of about 3000, (OH number 36.6 and acid number 0.35) and 4,4' diphenyl methane diisocyanate in a molar ratio to provide an NCO/OH ratio of 1.8. 82.4 parts by weight of the polyester were melted at 85° C. in a reactor equipped with an efficient stirrer. 0.25 parts tosyl isocyanate, 4.1 parts coumarone-indene resin B1 liquid and 12.3 parts Desmodur 44 Ms were added to the polyester under stirring. After stirring of this mixture for 1 hour at 85° C., 0.1 part dibutyl tin dilaurate dissolved in 0.3 parts Mesamoll plasticiser and 5 minutes later 0.6 parts 2-ethyl-hexanol (equivalent to 10% of available NCO groups) were added to this mixture. Stirring was continued for 30 minutes at 85° C. Then the product was degassed by evacuation under reduced pressure at 100° C. for 30 minutes and filled into aluminium cartridges or other moisture proof containers.

The aluminium cartridges were sealed until ready for application of the adhesive in heat softened form, i.e. as a hot melt adhesive composition.

The second illustrative composition was made as above described using the same ingredients and in the same amounts as the first illustrative composition, but using an organo tin mercaptide catalyst. The product had a viscosity at 100° C. of 24,000 mPas.

EXAMPLE 1

The illustrative adhesive compositions were used to form bonds between sample strips (30×100 mm) of roughed upper leather (1) and roughed sole leather (2) or primed plasticised polyvinyl chloride soling material. The PVC soling material was primed by wiping with a cloth soaked with a 0.5% solution of triethylene diamine in methyl ethyl ketone. The test materials and test methods used were according to FEICA recommendations. A thin film of the melted adhesive composition was applied to the soling samples at 100° C. After cooling, the soling material samples were exposed to airborne moisture for 24 hours at ambient conditions (20° C.±2° C., 35 to 75% RH). After this exposure of the soling materials, a thin film of the melted adhesive composition was applied to the upper material samples at 100° C. After cooling, the upper material samples were exposed to airborne moisture in a humidity chamber set at 90° C. and 26% RH. After a residence time in the chamber of 10 to 15 minutes, the sample strips were removed from the chamber, and allowed to cool at room conditions (20° C.±2° C. and not less than 10% RH) for about 15 minutes. The adhesive layers on the soling samples were exposed close to an infra-red heater (USM Model DVHG F) set at 85° C. to 90° C. with the layers and heater elements spaced approximately 45 mm apart for 4 to 5 seconds.

Pairs of soling and upper materials were spotted together and pressed for 12 seconds with 0.5 N/mm². Green strength of the bond was measured 15 seconds after pressing by peeling the bonds at 100 mm/min. Mature strength of the bond, was measured after ageing the strips for 5 days at 23° C. 50% RH. Results are shown in Table I together with those for comparative samples made using Bostik 7801. Bostik 7801 is a typical hog melt sole attaching adhesive according to the above-referenced U.K. Pat. No. 1540634. Bostik 7801 is available in Germany from Bostik GmbH and comprises a catalysed polyurethane prepolymer formed from toluene diisocyanate, 4,4'-diphenyl methane diisocyanate and poly (hexane diol adipate) and having an NCO:OH ratio of 1.8, melting point of 60° C. and a viscosity at 100° C. of about 17,000 mPas.

EXAMPLE 2

The illustrative adhesive compositions were used to form bonds between further sample strips of roughed upper leather (1), roughed sole leather (2), styrene butadiene rubber soling material (SBR) and PVC soling material. Prior to bonding, the SBR was halogenated using Unigrip 300, and the PVC soling material was primed by wiping with a cloth soaked with a 0.5% solution of triethylene diamine in methyl ethyl ketone. A thin film of the melted adhesive composition was applied to the soling samples at 100° C. These samples were exposed to airborne moisture under ambient conditions i.e. 20° C.±2° C. and not less than 10% RH. Bonds were made by use of soling samples aged for 14 days or for 8 weeks in this way. Upper leather samples were prepared by application of the melted adhesive at 100° C. After cooling, the upper material samples were exposed to airborne moisture in a humidity chamber set at 90° C. and 26% RH. After a residence time in the chamber of 10 to 15 minutes, the sample strips were removed from the chamber, and allowed to cool at room conditions (20° C.±2° C. and not less than 10% RH) for about 15 minutes. The aged soling samples were then heat activated by exposure to an infra-red heater set at 85 to 90° C. for a few seconds with the layers and heater elements spaced approximately 45 mm apart and pressed together. Green strength of the bond, and mature strength of the bonds, were determined. Results are shown in Table 2. Comparative samples made using Bostik 7801 required an activation temperature of 100° C. after 14 days ageing of the soles.

From the results of Examples 1 and 2, it can be seen that the reactivation temperature required in order to achieve a good sole attaching bond using the illustrative compositions (i.e. 85° to 90° C.) was less than that required using Bostik 7801 (i.e. 100° to 110° C.). It can also be seen that the time within which adhesive coated soles remained capable of heat activation under these conditions to achieve a good sole attaching bond using the illustrative compositions was 14 days or more.

EXAMPLE 3

Further sample bonds were made as described in Example 2, the soles being aged for 24 hours at ambient temperature prior to heat activation. The samples were subjected to creep tests. Results are shown in Table 3. From these results, it can be seen that adequate heat resistance may be achieved using adhesive compositions according to the invention.

EXAMPLE 4

The illustrative adhesive composition was melted and brought to a temperature of 100° C. and applied as an adhesive coating layer to the previously roughened sole attaching surface of a leather shoe upper and to the attaching surface of an outsole compounded of a vulcanised butadiene styrene copolymer synthetic rubber, and halogenated with Unigrip 300. The adhesive was applied as a band, on the attaching margin of the outsole, extending around at least the forward portion of the outsole.

The deposited composition on the shoe upper was then subjected to airborne moisture in a chamber as described in U.K. Patent Application No. 8230200. The adhesive layer was treated under conditions obtained in such a chamber by exposure for 20 seconds, infra-red radiant surface temperature 350° C. and steam supply for 9 seconds, followed by a period of cooling in atmosphere at room temperature. The composition on the sole was subjected to airborne moisture under ambient conditions (20° C.±2° C. not less than 10% RH) for 15 hours. After these chain extension treatments, the material of the layers was tough, strongly adherent to the attaching surfaces, and capable of being softened to tacky condition adhesive to like adhesive surfaces at temperatures of about 85° C.

After chain extension of the urethane prepolymer, completion of the sole attaching process involved disposing the outsole having adhesive on its attaching surface on a rack spaced approximately 45 mm from radiant heating elements for 5 seconds with the heat unit set at 85° to 90° C. to warm the adhesive and bring it to a condition in which it was tacky and somewhat rubbery, but deformable and flowable under pressure and capable of adhesive union. After heating of the adhesive, the sole was assembled against the attaching surfaces of the bottom of the shoe upper and spotting tack was excellent. A strong initial bond was formed with no separation or "grinning". The assembled outsole and shoe upper were placed in a sole attaching press, subjected to sole attaching pressure and allowed to cool. The bond strength was considered satisfactory for use of the shoe.

TABLE I

| | PEEL STRENGTH (N/cm) | | | |
|---|---|---|---|---|
| | Leather 1 to Leather 2 | | Leather 1 to PVC | |
| TYPE | Green Strength | Mature Strength | Green Strength | Mature Strength |
| BOSTIK 7801 | 27 | 101 | 14 | 93 |
| First Illustrative Adhesive | 46 | 108 | 30 | 100 |
| Second Illustrative Adhesive | 36 | 125 | 27 | 138 |

TABLE 2

| FIRST ILLUSTRATIVE ADHESIVE - Soles: 14 days at ambient conditions | | | |
|---|---|---|---|
| | Spotting Tack | Green Strength (N/cm) | Mature Strength (N/cm) |
| Leather 1 to Leather 2 | Excellent | 31 ± 5 | 70 ± 10 |
| Leather 1 to SBR | Excellent | 36 ± 5 | 87 ± 19 |
| Leather 1 to PVC | Excellent | 31 ± 5 | 72 ± 5 |
| SECOND ILLUSTRATIVE ADHESIVE - Soles: 8 weeks at ambient condtions | | | |
| | Spotting Tack | Green Strength (N/cm) | Mature Strength after 5d (N/cm) |
| Leather 1 to Leather 2 | Excellent | 51 ± 7 | 126 ± 52 |
| Leather 1 to SBR | Good | 31 ± 15 | 100 ± 17 |
| Leather 1 to PVC | Excellent | 30 ± 8 | 79 ± 19 |

TABLE 3

| | CREEP TEST RESULTS | | | | | | | | | |
|---|---|---|---|---|---|---|---|---|---|---|
| | 1 Kp; mm/10 min BOSTIK 7801 | | | | 1.5 Kp; mm/10 min First Illustrative Adhesive | | | 1.5 Kp; mm 10 min Second Illustrative Adhesive | | |
| MATERIALS | 70° C. | 80° C. | 90° C. | 100° C. | 60° C. | 70° C. | 80° C. | 70° C. | 80° C. | 90° C. |
| Leather 1 to Leather 2 | 0–1 | 0–1 | 0–16 | Total | 1–2 | 0–2 | Total | 0 | 1 | 25 |
| Leather 1 to SBR | 0–1 | 0–3 | 2–70 | Total | 2–3 | 2–22 | Total | 4 | 8 | Total |
| Leather 1 to PVC | 0–6 | 0–9 | Total | | 0–1 | 22–42 | — | 5 | 56 | Total |

We claim:

1. A solvent free, adhesive composition capable of application to a workpiece in heat softened condition to provide a layer which after exposure to moisture is capable of activation by heat to a bond forming condition to form an adhesive bond, the composition comprising a minor amount of a tackifying resin and a moisture curable polyurethane formed from a first component comprising a diisocyanate, and a second component comprising a substantially linear hydroxy polyester diol having a crystalline melting point in the range 40° C. to 70° C. and a molecular weight in the range 1500 to 6000 in proportions to provide an NCO:OH ratio in the range 2.5:1 to 1.25:1 and to provide a prepolymer having from 1.0 to 2.0 percent by weight —NCO groups available for reaction, and a third component comprising a monofunctional reactant having as its sole reactive group an —OH or —NH$_2$ group, present in an amount sufficient to react with 1–40 mole % of the NCO groups of the product of the prepolymer reaction.

2. An adhesive composition of claim 1 where the monofunctional reactant comprises an aliphatic alcohol having a boiling point greater than 100° C. and having from 4 to 14 carbon atoms in its molecule.

3. An adhesive composition of claim 1 or claim 2 where the monofunctional reactant is present to an extent of 5 to 15 mole % of the isocyanate groups of the prepolymer.

4. An adhesive composition of claim 1 or claim 2 where the monofunctional reactant comprises 2-ethyl hexanol present in an amount sufficient to react with about 10 mole % of the NCO groups.

5. An adhesive composition of claim 1 or claim 2 where the polyurethane prepolymer is formed from a hydroxyl terminated substantially linear polyester having a molecular weight in the range from 2,500 to 4,500 corresponding to a reaction product of a linear aliphatic dicarboxylic acid having 6 to 12 carbon atoms in its molecular chain and a linear aliphatic diol having 4 to 8 carbon atoms in its molecular chain.

6. An adhesive composition of claim 1 or claim 2 where the diisocyanate comprises 4,4' diphenyl methane diisocyanate, and the polyester comprises a poly(butane diol adipate).

7. An adhesive composition of claim 1 or claim 2 where the prepolymer has from 1.3 to 1.7% by weight —NCO groups available for reaction.

8. An adhesive composition of claim 1 or claim 2 where the prepolymer is formed from reaction of the polyester and diisocyanate in quantities providing an NCO:OH ratio of about 1.8:1.

9. An adhesive composition of claim 1 or claim 2 in the form of a solid at room temperature having a melting point in the range 45° to 70° C.

10. An adhesive composition of claim 1 or claim 2 where the tackifying resin comprises a coumarone-indene resin and provides up to 10% by weight of the composition.

* * * * *